(12) United States Patent
Neff et al.

(10) Patent No.: US 10,511,649 B2
(45) Date of Patent: Dec. 17, 2019

(54) METHOD AND APPARATUS FOR EFFICIENTLY PRIORITIZING ELEMENTS IN A VIDEO STREAM FOR LOW-BANDWIDTH TRANSMISSION

(71) Applicant: Pelco, Inc., Clovis, CA (US)

(72) Inventors: Bryan K. Neff, Fresno, CA (US); Farzin Aghdasi, Clovis, CA (US)

(73) Assignee: Pelco, Inc., Clovis, CA (US)

( * ) Notice: Subject to any disclaimer, the term of this patent is extended or adjusted under 35 U.S.C. 154(b) by 246 days.

(21) Appl. No.: 13/682,688

(22) Filed: Nov. 20, 2012

(65) Prior Publication Data

US 2014/0143385 A1    May 22, 2014

(51) Int. Cl.
*H04L 29/06*  (2006.01)
*H04L 12/851* (2013.01)
(Continued)

(52) U.S. Cl.
CPC ............ *H04L 65/608* (2013.01); *H04L 47/24* (2013.01); *H04L 47/2416* (2013.01); *H04L 47/32* (2013.01); *H04L 65/602* (2013.01); *H04L 65/80* (2013.01); *H04N 21/2187* (2013.01); *H04N 21/64792* (2013.01); *H04N 21/835* (2013.01)

(58) Field of Classification Search
CPC ....... H04N 19/00884; H04N 19/00569; H04N 21/2187; H04N 21/64792; H04N 21/835; H04L 47/10; H04L 65/608; H04L 47/24; H04L 67/2804; H04L 47/32; H04L 65/602; H04L 65/80; H04L 47/2416; G06F 3/04842

USPC .......... 709/219, 231; 382/240, 243; 375/240.12; 370/389; 715/716
See application file for complete search history.

(56) References Cited

U.S. PATENT DOCUMENTS 6,222,841 B1 * 4/2001 Taniguchi ............... H04L 47/10
                                                  370/230
6,449,251 B1 * 9/2002 Awadallah et al. ........... 370/229
(Continued)

FOREIGN PATENT DOCUMENTS

CN        1246644 A      3/2000
CN      102104538 A      6/2011
(Continued)

OTHER PUBLICATIONS

Network Working Group, "RTP: A Transport Protocol for Real-Time Applications," 98 pages, Jul. 2003.
(Continued)

*Primary Examiner* — Zi Ye
(74) *Attorney, Agent, or Firm* — Tutunjian & Bitetto, P.C.

(57) ABSTRACT

Processing video for low-bandwidth transmission may be complex. At a content source embodiment of methods disclosed herein may include assigning the content identifier as a function of content in a packet of a packet stream on a packet-by-packet basis. The method may further comprise forwarding the content identifier with the packet to enable a downstream network node or device to effect prioritization of the packet within the packet stream. The downstream network node or device may make drop decisions that are guided by a content identifier. Packets, or video frames that contain useful information may be prioritized and have a higher probability of being delivered.

18 Claims, 9 Drawing Sheets

(51) Int. Cl.
*H04L 12/823* (2013.01)
*H04N 21/2187* (2011.01)
*H04N 21/647* (2011.01)
*H04N 21/835* (2011.01)
*H04L 12/853* (2013.01)

(56) References Cited

U.S. PATENT DOCUMENTS

| | | | |
|---|---|---|---|
| 6,538,689 B1 * | 3/2003 | Chang | G08B 13/19645 348/159 |
| 6,690,881 B1 * | 2/2004 | Tomita et al. | 386/224 |
| 7,000,245 B1 * | 2/2006 | Pierre | H04N 5/4401 348/563 |
| 7,237,108 B2 * | 6/2007 | Medvinsky et al. | 713/160 |
| 7,630,570 B1 * | 12/2009 | Haskell et al. | 382/243 |
| 7,724,682 B2 * | 5/2010 | Kovacevic | 370/252 |
| 7,773,581 B2 | 8/2010 | Punj et al. | |
| 8,140,698 B2 * | 3/2012 | Codella et al. | 709/231 |
| 8,363,548 B1 * | 1/2013 | Aboul-Magd et al. | 370/235 |
| 2002/0054173 A1 * | 5/2002 | Miller | G06F 3/04842 715/860 |
| 2003/0065917 A1 | 4/2003 | Medvinsky et al. | |
| 2004/0221053 A1 | 11/2004 | Codella et al. | |
| 2004/0240543 A1 | 12/2004 | Faroudja | |
| 2006/0002426 A1 | 1/2006 | Madour | |
| 2009/0059804 A1 | 3/2009 | Fujikami et al. | |
| 2010/0169503 A1 * | 7/2010 | Kollmansberger | H04L 67/2804 709/231 |

FOREIGN PATENT DOCUMENTS

CN 102148815 A 8/2011
EP 2091205 A1 * 8/2009

OTHER PUBLICATIONS

Huang, T.Y., "Prioritized MPEG-4 Audio-Visual Objects Streaming Over the DiffServ," *Journal of Electronic Science and Technology of China*, 3(4) 314-320 (Jan. 2005).

Notification of Transmittal of the International Search Report and the Written Opinion for PCT/US2013/070069, "Method and Apparatus for Efficiently Prioritizing Elements in a Video Stream for Low-Bandwidth Transmission," dated Feb. 6, 2014.

Notification Concerning Transmittal of International Preliminary Report on Patentability for PCT/US2013/070069, "Method and Apparatus for Efficiently Prioritizing Elements in a Video Stream for Low-Bandwidth Transmission", dated Jun. 4, 2015.

* cited by examiner

| CONTENT TYPE 302 | CONTENT ID 304 | PRIORITY 306 |
|---|---|---|
| OBJECT TYPE(1) | CONTENT ID(1) | PRIORITY(20) |
| FACE | 0000 0000 0000 0001 | PRIORITY(35) |
| LICENSE PLATE | 0000 0000 0000 0010 | PRIORITY(N) |
| FACE + LICENSE PLATE | 0000 0000 0000 0011 | PRIORITY(1) |
|  |  |  |
| OBJECT TYPE(N) | CONTENT ID(N) | PRIORITY(36) |

METHOD AND APPARATUS FOR EFFICIENTLY PRIORITIZING ELEMENTS IN A VIDEO STREAM FOR LOW-BANDWIDTH TRANSMISSION

BACKGROUND OF THE INVENTION

Streaming video content in networks may come from a variety of sources. For example, a video surveillance system may provide a video content stream including images of whatever is within the field-of-view of a surveillance video camera's lens. Video content over networks has increased as films and other video programs have become increasingly accessible in the home via the Web. Network bandwidth demands continue to increase as more and more applications stream video and other content in networks.

SUMMARY OF THE INVENTION

Embodiments of the present invention provide a method, apparatus, and corresponding system for prioritizing packets in a communications network. According to one embodiment, a method for prioritizing packets in a communications network may comprise mapping content to a content identifier. At a content source, the method may comprise assigning the content identifier as a function of content in a packet of a packet stream on a packet-by-packet basis. The method may further comprise forwarding the content identifier with the packet to enable a downstream network node to effect prioritization of the packet within the packet stream.

The content source may be a video camera, a video recorder, or a gateway.

The content may be included within a video frame.

The content may include representations of real-world articles and optionally computer-generated graphical indicators.

The content identifier may map content, such as video content, to a substantive object identifier. The substantive object identifier may indicate a face, license plate, personalized identifier, or other representation associated with a subject (e.g., person, animal, or object), within a scene in an image or audio recording.

Mapping content to the content identifier may include utilizing a standard content mapping table. The downstream node may assign prioritization using the standard content mapping table.

The method may further include assigning a priority to the content identifier. Mapping content to the content identifier and assigning the priority to the content identifier may occur at the content source. Mapping content to the content identifier may occur at the content source, and assigning the priority to the content identifier may occur at a device separate from the content source.

According to one embodiment, forwarding the content identifier with the packet may include forwarding the content identifier in a packet associated with the packet including the content. Forwarding the content identifier with the packet may include specifying the content identifier in a Real-Time Protocol (RTP) header extension. The method may further comprise mapping video content to a substantive object through the use of the content identifier specified in the Real-Time Protocol (RTP) header extension.

According to another embodiment, a method for prioritizing packets at a network node may comprise accessing a mapping of a plurality of content identifiers to a plurality of prioritization values. The method may prioritize packets with a set of content identifiers of the plurality of content identifiers in a packet stream. The set of content identifiers may be a function of content included in the packets prioritized. Prioritizing may be based on the set of content identifiers and a set of prioritization values of the plurality of prioritization values based on the mapping accessed.

The content may be contained within a video frame.

The content identifier may map content, such as video content, to a substantive object identifier. The substantive object identifier may indicate a face, license plate, personalized identifier, or other representation associated with a subject (e.g., person, animal, or object), within a scene in an image or audio recording. The content identifier may be assigned to each packet at a video source.

The method may further include determining a drop or forward action for each packet based on the content identifier included and the mapping of the content identifier to the prioritization value.

According to another embodiment, an apparatus may comprise a video content classifier configured to assign a content identifier as a function of content in a packet of a video packet stream on a packet-by-packet basis. The apparatus may further include a forwarding engine configured to forward the content identifier with the packet to enable a downstream network node to effect prioritization of the packet within the video packet stream.

According to yet another embodiment, a non-transitory computer-readable medium having stored thereon a sequence of instructions which, when loaded and executed by a processor, may cause the processor to process a video scene and produce a packet stream including a plurality of packets representing the video scene. The processor may further be caused to assign a content identifier to each packet in the plurality of packets, each packet may include an assigned content identifier, and the assigned content identifier may be assigned as a function of the video content represented by each packet.

It should be understood that embodiments of the present invention can be implemented in the form of a method, apparatus, system, or computer-readable medium with program codes embodied thereon. In general, it should be understood that elements of the method, block, and flow diagrams described herein may be implemented in software, hardware, firmware, as understood by one of ordinary skill in the art. Example embodiments of the present invention may include a non-transitory computer-readable medium containing instructions that may be loaded and executed by a processor, and, when executed, may cause the processor to complete methods described herein. For ease of reading, the term "system" is used in various portions of the description and may represent some or all forms of embodiments and implementations of the present invention, such as systems, methods, apparatuses, devices, computer-readable media, network nodes, and networks.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

When delivering video or other content over a network, network conditions may change. For example, changes to bandwidth may cause congestion resulting in dropped video or other content by network devices transporting the video or other content in the network. Streaming video content or other content across a low-bandwidth link or even a highly saturated hard-wired link may often result in dropped frames due to congestion in the medium somewhere along the path. Individual packets of video (or other data) may be randomly dropped by link-saturated networking devices in order to reduce the total bandwidth.

Such randomly dropped packets may include data that may be classified as being more useful than data included in packets not being dropped. For example, in the field of surveillance, packets including data related to an object of interest may be more useful than packets including data related to a background surrounding the object of interest. In the presence of congestion, random packet drops by a network device may affect loss of video content that may include useful, security-pertinent content while transporting packets, including less useful content.

Further, networks transport packets including data other than video content. For example, packets may include voice content. In the case of voice, packets including dialog may be more useful than packets including silence. For example, a 911 emergency call may include dialog specifying a street address to which an emergency responder should arrive. In the presence of congestion, random packet drops by a network device may affect loss of the packets, including dialog, from the 911 emergency call. The dropped packets may include more useful content, such as the dialog specifying the street address, while transporting packets including less useful content, such as silence that may be present during the call.

Figure 1A:
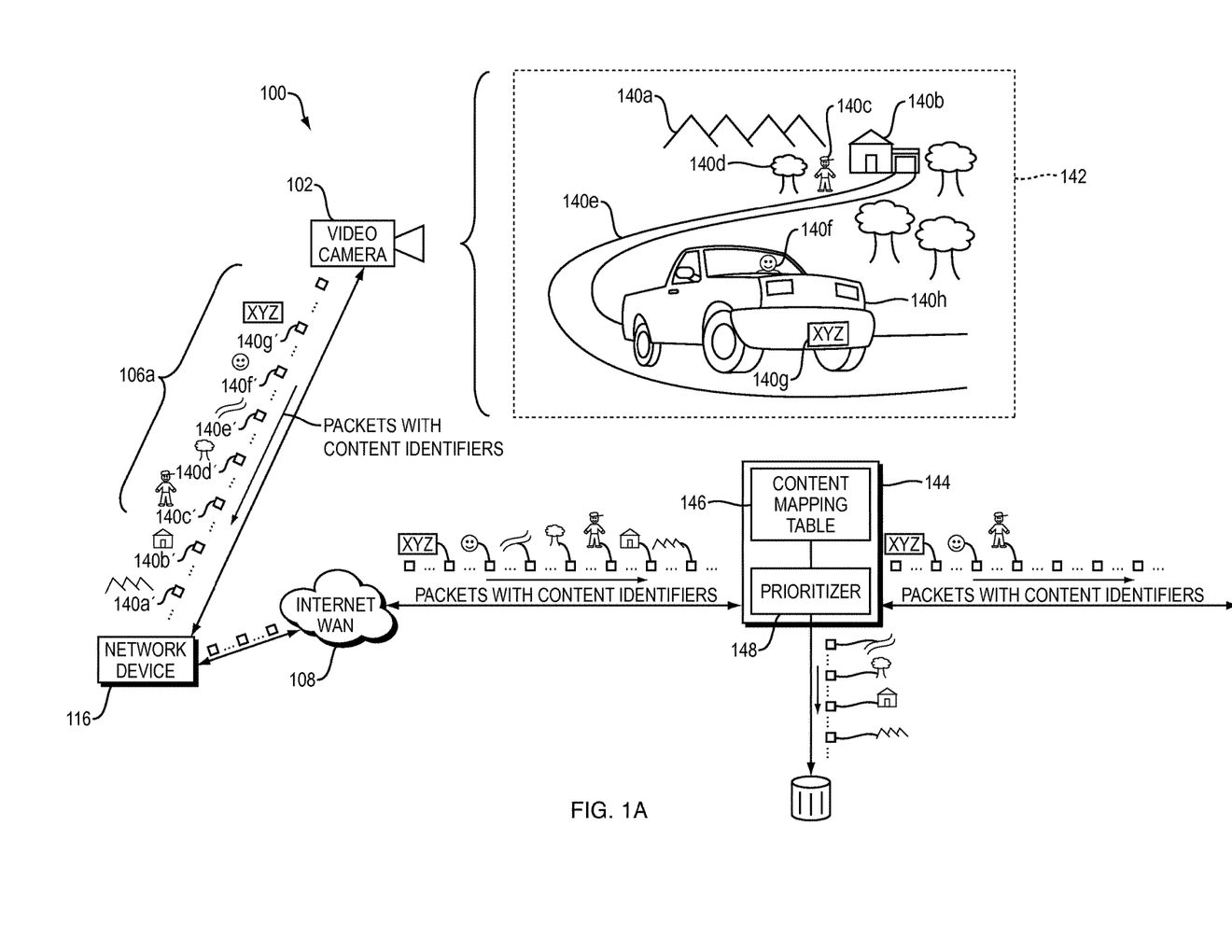
FIG. 1A illustrates an embodiment of a system for prioritizing packets in a communications network.

FIG. 1A illustrates an embodiment of a system 100 for prioritizing packets in a communications network. In the example embodiment, a source, such as a video camera 102 may capture images of whatever is within the field-of-view of the video camera's lens. For example, the video camera 102 may capture a video scene including a video frame 142 containing content, such as images of a mountain range 140a, house 140b, person 140c, tree 140d, driveway 140e, truck 140h, license plate 140g, and face 140f of a driver of the truck 140f. In the example embodiment, the video camera 102 may send captured video via video stream that includes packets with content identifiers 106a. The content identifiers may indicate the substantive type of content being transmitted, enabling intelligent drop decisions by a network device 116 or downstream node 144 receiving the video stream to efficiently lower bandwidth transmission.

The substantive type may represent a real-world article such as the face 140f, truck 140f, license plate 140g, personalized identifier (not shown), etc. In the example embodiment, the video frame 142 may include useful video surveillance information. The face 140f of the driver may be the face of an intruder who has stolen goods from the house 140b. The person 140c may be an accomplice to the intruder. The face 140f of the driver, person 140c, and license plate 140g may be useful information for identification of the intruder and accomplice of the robbery at the house 140b. In the example embodiment, video captured from the video camera is sent to a network device 116, over a network 108, to a downstream network node 144 and other (not shown) networks, nodes, or other devices for purposes of delivering the video captured to an end user (not shown) or device (not shown) that may analyze the video captured. In the example embodiment, the downstream node 144 has detected a condition indicating that received packets should be dropped in order to reduce bit rate.

Packets including content of the person 140c', face 140f', and license plate 140g' may be deemed to be more useful than packets including content of the mountain range 140a', house 140b', tree 140d', and driveway 140e'. At the video source, packets including content of the video frame 142 may have been assigned content identifiers as a function of the content in the packet. The packets with the content identifiers 160a may be sent by the video camera 102. The downstream node 144 may utilize a content mapping table 146 to map content in received packets as a function of content identifiers with the packets. Content such as the person 140c, face 140, and license plate 140g may have respective content identifiers with the packets 140c', 140f', and 140g' that map to priorities that are higher relative to priorities mapped to content identifiers associated with other content, such as the mountain range 140a, house 140b, tree 140d, driveway 140e, etc. The packets with content of the person 140c', face 140f, and license plate 140g' may be sent by the downstream node 144 while the packets with content of the mountain range 140a', house 140b', tree 140d', driveway 140e, etc. may be dropped. The downstream node 144 may include a prioritizer 148 that accesses the content mapping table 146 to determine the priority of the packets with content identifiers 106a to efficiently prioritize elements in the video stream to lower bandwidth transmission.

According to embodiments of methods disclosed herein, when paired with analytics, a packet may be marked as containing e.g., a face, license plate, personalized identifier, dialog, or other useful content, and subsequently packets including more useful content may not be dropped to reduce transmission bandwidth. According to embodiments of methods disclosed herein, packets may be prioritized based on content of a packet. Based on a content identifier, intelligent packet drop decisions may be made, enabling content classified as being useful to be delivered with greater probability.

Embodiments of methods disclosed herein may be used to reduce bit rate by applying an analytical understanding of the content being transported in a network. Former approaches may drop packets randomly in the presence of congestion. For example, if packets are filling the packet buckets faster than they can be scheduled on a wire, a former approach is that a network device may pick a random packet and drop it. Other approaches, such as transcoding, may transcode video to reduce its bit rate but at the expense of high CPU load and added delay.

Figure 1B:
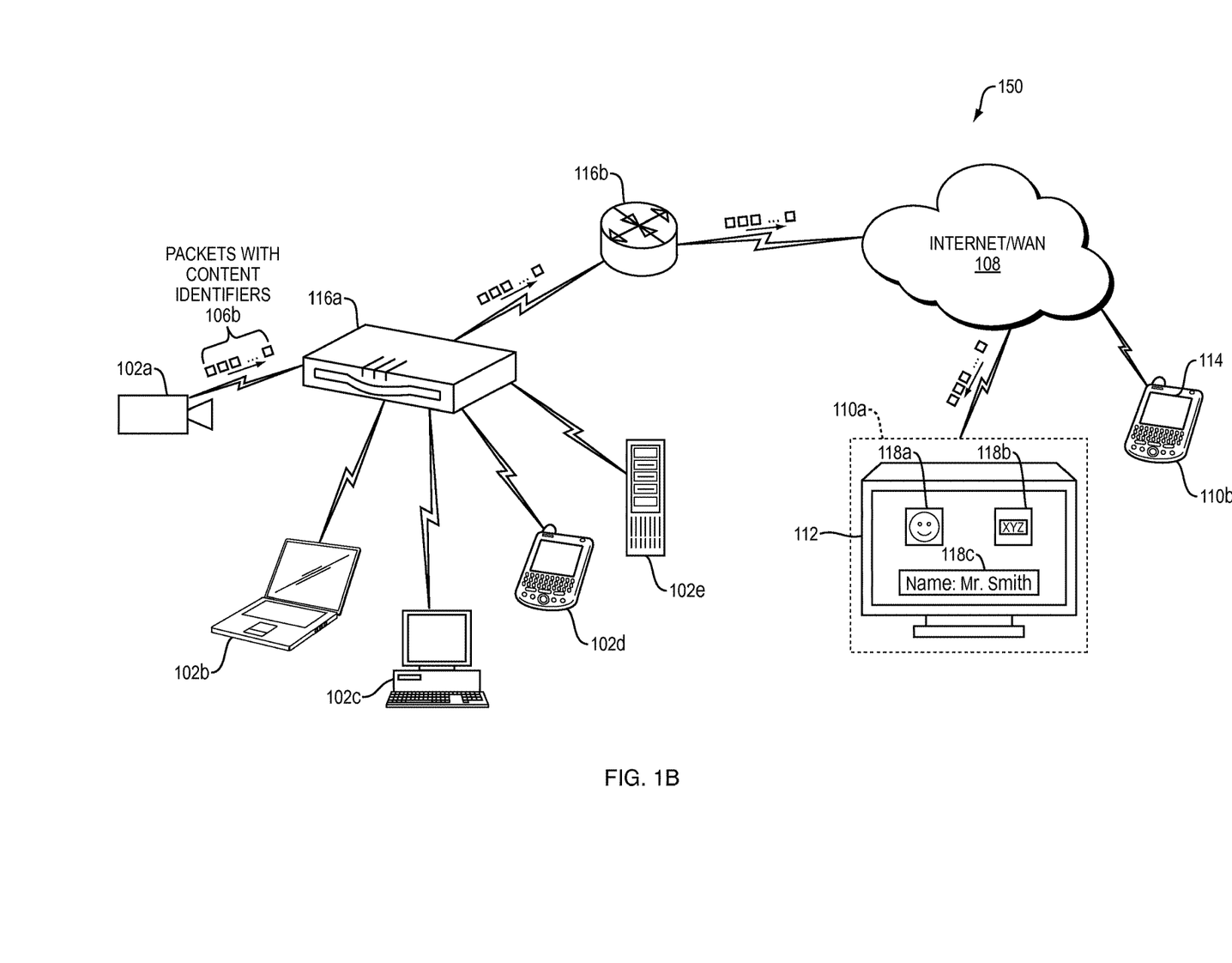
FIG. 1B illustrates another embodiment of a system for prioritizing packets in a communications network.

FIG. 1B illustrates another embodiment of a system 150 for prioritizing packets in a communications network. A source 102a-e may add a content identifier to indicate the substantive type of content being transmitted, and a network device transporting the content may determine packet handling actions (e.g., drop or forward) based on a priority that may be derived from the content identifier. A source may be a video camera 102a, gateway 102e, cell phone 102d, Internet Protocol phone (not shown), digital video recorder (DVR) (not shown), laptop 102b, desktop computer 102c, or any other suitable source. The source 102a-e may send packets 106b to be received by one or more destinations 110a or 110b communicatively coupled over a network 108. The network 108 may be wide-area network (WAN), such as the Internet, a wireless network, a local-area network (LAN), a cellular network, or another type of network.

Continuing to refer to FIG. 1B, a network switch 116a, router 116b, or any other suitable one or more network devices may be utilized in transporting the packets 106b along a path from a source to one or more destinations. For example, the network switch 116a may be communicatively coupled to the source 102a and to the router 116b in order to deliver the packets 106b via the network 108 to a destination networking system (not shown) or destination network device 110a or 110b. The destination network devices may be any suitable network devices. Source, network, and destination devices described herein may be wired or wireless. The destination network devices 110a and 110b may include a display devices 112 and 114, respectively, and/or speakers (not shown), for delivering the content of the received packets (e.g., video or audio) to a user (not shown). Display devices may be stand-alone devices or integrated into the destination device.

The switch 116a, router 116b, or other suitable networking device along the path between a source and a destination may receive a packet with a content identifier specified by the source. A network device along the path may need to reduce bit rate. The switch 116a, router 116b, or other suitable networking device along the path may decide whether or not to drop or forward the packet based on a priority mapping for the content identifier with the packet. While packets may still be dropped, each drop decision may be guided by a content identifier and its corresponding priority, enabling drop decisions to be based on a priority that indicates whether or not the content included in each packet is useful. Network devices may prioritize the packets based on a content identifier with the packet.

A content identifier may map video content to a substantive object identifier. For example, the substantive object identifier may indicate a face 118a, license plate 118b, or a personalized identifier 118c. The content identifier may enable intelligent drop decisions because the content identifier may be assigned as a function of content in a packet of a packet stream on a packet-by-packet basis. According to embodiments of methods disclosed herein, when paired with analytics, a packet may be marked as containing e.g., a face, license plate, personalized identifier, dialog, or other useful content, and subsequently packets including more useful content may not be dropped to reduce bandwidth. According to embodiments of methods disclosed herein, packets may be prioritized based on content of a packet. Based on a content identifier, intelligent packet drop decisions may be made, enabling content classified as being useful to be delivered with greater probability.

Typically, network traffic, otherwise referred to herein as data, packets, or packetized data, may be dropped based on priority assigned to a type of traffic. According to embodiments of methods disclosed herein, traffic may be dropped according to the content within a type of traffic. For example, in the context of video, a source providing a video frame may segment the video frame into multiple packets. Each packet of the video frame may be assigned a content identifier by the source, based on the content of the video frame that is included in the packet. Network devices may prioritize the packets based on a content identifier with the packet.

Figure 2:
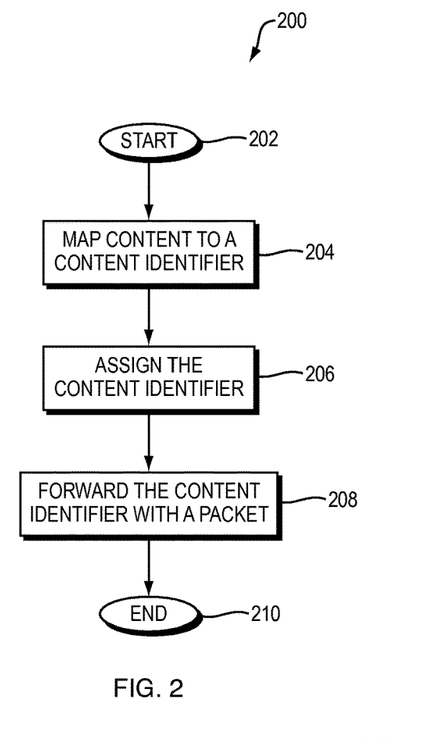
FIG. 2 is a flow diagram illustrating an embodiment of method for prioritizing packets in a communications network.

FIG. 2 is a flow diagram illustrating an embodiment of method for prioritizing packets in a communications network (200). The method may start (202) and map content to a content identifier (204). At a content source, the method may assign the content identifier as a function of content in a packet of a packet stream on a packet-by-packet basis (206). The method may further forward the content identifier with the packet to enable a downstream network node to effect prioritization of the packet within the packet stream (208) and the method thereafter ends (210) in this example embodiment. The content identifier may map video content to a substantive object identifier. The substantive object identifier may indicate a face, a license plate, or a personalized identifier. Thus, intelligent packet drop decisions may be made, enabling video content that has been classified as being useful to be delivered with greater probability. For example, in a surveillance system, the video content may be a face in a video scene. An object, such as a face, may be deemed as useful as the face may be the face of an intruder. A face may be classified as a substantive object that is more useful than other video content in a video scene.

Figure 3:
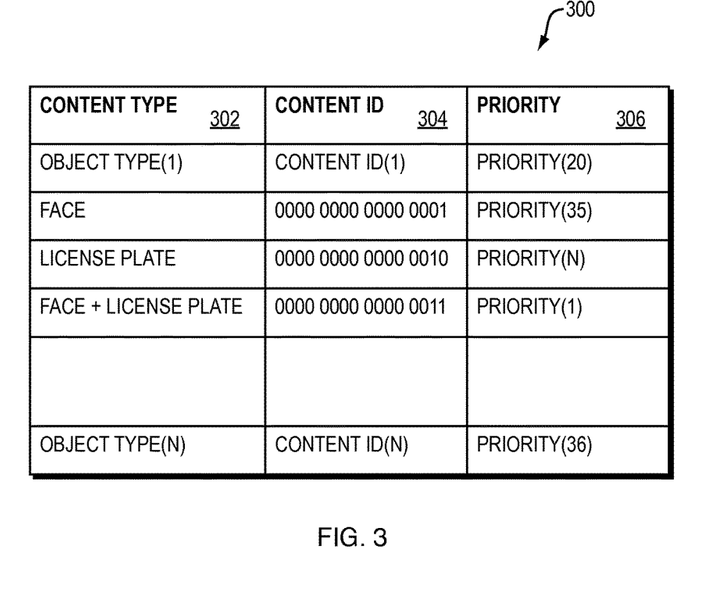
FIG. 3 is an example of an embodiment of a content mapping table 300 that maps content types to content identifiers and priorities.

FIG. 3 is an example of an embodiment of a content mapping table 300 that maps content types 302 to content identifiers 304 and priorities 306. During packetization of a frame, source devices such as cameras/encoders may use analytics to determine the content (e.g., content type) of video. The content identifiers may be assigned based on pre-defined values that correspond to the content type determined.

By including a content identifier with a packet, network devices transporting the multiple packets do not need to decode the payload of the packet to determine the content. A network device may extract the content identifier from the packet stream and determine a priority for the packet based on the content identifier 304 with the packet and the associated priority 306. The content mapping table 300 may be implemented in any suitable manner and may be one or more mapping tables. The content mapping table 300 may be distributed to devices communicatively coupled in the network. The content mapping table may include version information as well as version translation information to facilitate backward compatibility.

The content identifiers may include known or custom identifiers and a set of content identifiers may grow. Network devices may decode the content identifiers and map the content identifiers to a priority value in order to determine packet drop candidates.

When paired with analytics, a packet may be marked as containing e.g., a face, license plate, and subsequently should not be dropped to reduce bandwidth. The content types 302, content identifiers 304, and priorities shown in the content mapping table 300 are for example purposes, any suitable values for the content identifiers, content types, priorities or mapping thereof may be implemented. Further, any suitable mapping between the values and types shown may be used. The mapping tables may be implemented in any suitable manner such as by pointers, pointers to pointers, etc. The mapping tables may be shared (e.g., via network communication) amongst network devices or network nodes to enable synchronization of the values and mapping between the values included in the mapping tables. Content identifiers may include one or more fields. Content identifiers may include a field specifying a version. Mapping a content identifier to a priority value may include decoding a version included in the content identifier.

According to another embodiment, an object may be classified based on distance, such that objects closer to a camera may be marked as higher priority because they may contain more useful (easier to recognize) video. According to another embodiment, a depth sensor in combination with a thermal camera may assist object classification.

According to one embodiment, during packetization of a frame, content identifiers may be included in a real-time transport protocol (RTP) header extension. RTP provides end-to-end network transport functions that may be suitable for applications transmitting real-time data, such as audio, video, or other data, over multicast or unicast network services. RTP is a protocol framework that is deliberately not complete. Unlike conventional protocols in which additional functions might be accommodated by making the protocol more general or by adding an option mechanism that would require parsing, RTP is intended to be tailored through modifications and/or additions to the headers as needed. A tag such as the content identifier may be placed in the RTP header extension field, to be used by a network device to identify the priority of a packet and determine whether or not the packet may be "safely" dropped. Decoding of the underlying media codec by the network device is not necessary.

Figure 4:
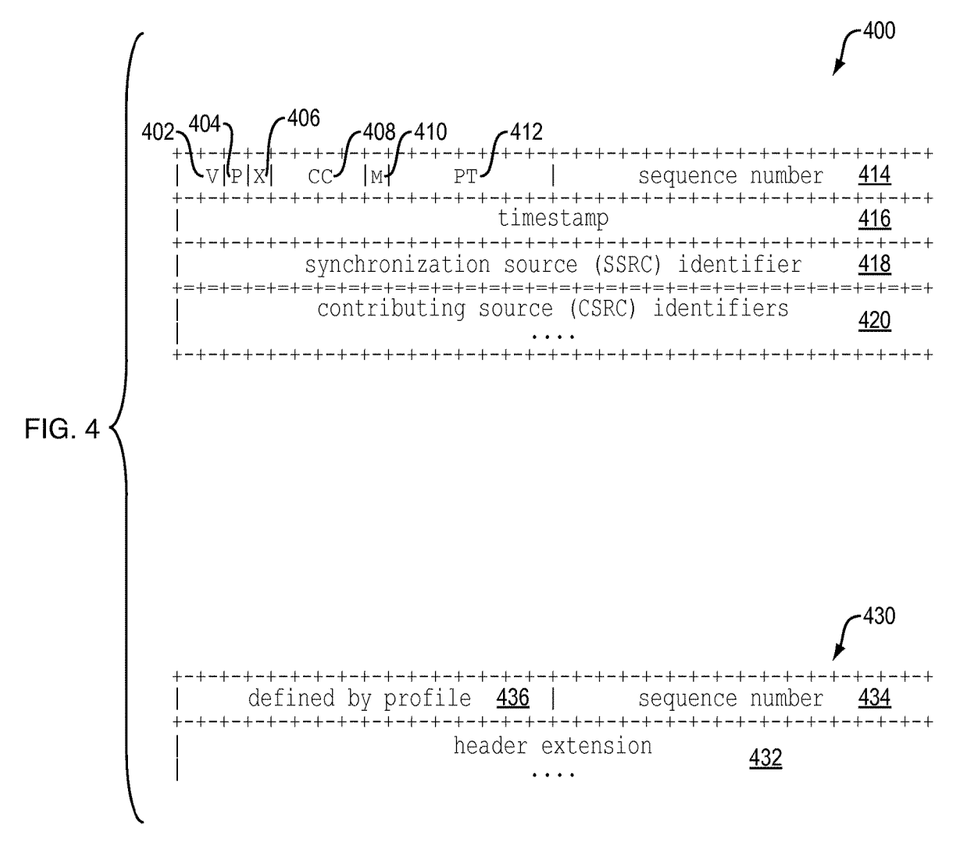
FIG. 4 is an example of real-time transport protocol (RTP) header formats.

FIG. 4 is an example of RTP header formats as defined by RFC 3550 Section 5.3.1 (400). According to RFC 3550 Section 5.3.1, the RTP header format includes a version field 402 (2 bits). The version field 402 may identify the version of RTP. The header format also includes a padding field 402 (1 bit). If the padding bit is set, the packet contains one or more additional padding octets at the end which are not part of the payload. The header format also includes an extension field 406 (1 bit).

If the extension bit is set, the fixed header must be followed by exactly one header extension, according to the format defined in RFC 3550 Section 5.3.1. The header format also includes a contributing source count 408 (4 bits). The contributing source count contains the number of contributing source (CSRC) identifiers that follow the fixed header. The header format also includes a marker field 410 (1 bit). The interpretation of the marker is defined by a profile. The header format includes a payload type field 412 (7 bits). The payload type field 412 identifies the format of the RTP payload and determines its interpretation by an application.

The header format also includes a sequence number field 414 (16 bits). The sequence number increments by one for each RTP data packet sent, and may be used by the receiver to detect packet loss and to restore packet sequence. The header format also includes a timestamp field 416 (32 bits). The timestamp reflects the sampling instant of the first octet in the RTP data packet. The header format also includes a synchronization source (SSRC) field 418 (32 bits). The SSRC field 418 identifies the synchronization source. The header format also includes a CSRC list 420 (0 to 15 items, 32 bits each). The CSRC list 420 identifies the contributing sources for the payload contained in the packet.

An RTP extension header that may be used according to embodiments disclosed herein is illustrated (430). As defined in RFC 3550 Section 5.3.1, RTP provides an extension mechanism to allow individual implementations to experiment with new payload-format-independent functions that require additional information to be carried in the RTP data packet header. The mechanism is designed so that the header extension may be ignored by other interoperating implementations that have not been extended. If the X bit in extension field 406 is set to one in the RTP header is one, a variable-length header extension 432 must be appended to the RTP header, following the CSRC list 420 if present. The header extension 432 contains a 16-bit length field 434 that counts the number of 32-bit words in the extension; excluding the four-octet extension header (therefore zero is a valid length). Only a single extension can be appended to the RTP data header.

To allow multiple interoperating implementations to each experiment independently with different header extensions, or to allow a particular implementation to experiment with more than one type of header extension, the first 16 bits of the header extension 436 are left open for distinguishing identifiers or parameters. The format of these 16 bits is to be defined by the profile specification under which the implementations are operating. This RTP specification does not define any header extensions itself.

According to one embodiment, a tag such as the content identifier may be placed in the RTP header extension field, to be used by a network device to identify the priority of a packet and determine whether or not the packet may be "safely" dropped. For example, the header extension field may be filled with content identifiers from a mapping table such as the mapping table illustrated in FIG. 3A that illustrates values such as 0000000000000001b, corresponding to a video content such as a face, 0000 000000000010b, corresponding to video content such as a license plate or 00000000 00000011b corresponding to video content such as a face and a license plate.

To reduce bit rate, a network device may be guided by the content identifier included in the RTP header extension field in order to determine an action regarding a packet. According to embodiments of methods disclosed herein, actions regarding packet handling (e.g., drop or forward) may be based on packet content, for example, a face or a license plate, on a packet-by-packet basis. Decoding packet content at the receiving network device is not necessary as the packet content is indicated by the content identifier. The content identifier may assigned by the source of the content. For example, a device for capturing a video scene, or a device for digitizing a voice call, may assign a content identifier to each packet of a packet stream on a packet-by-packet basis.

Figure 5:
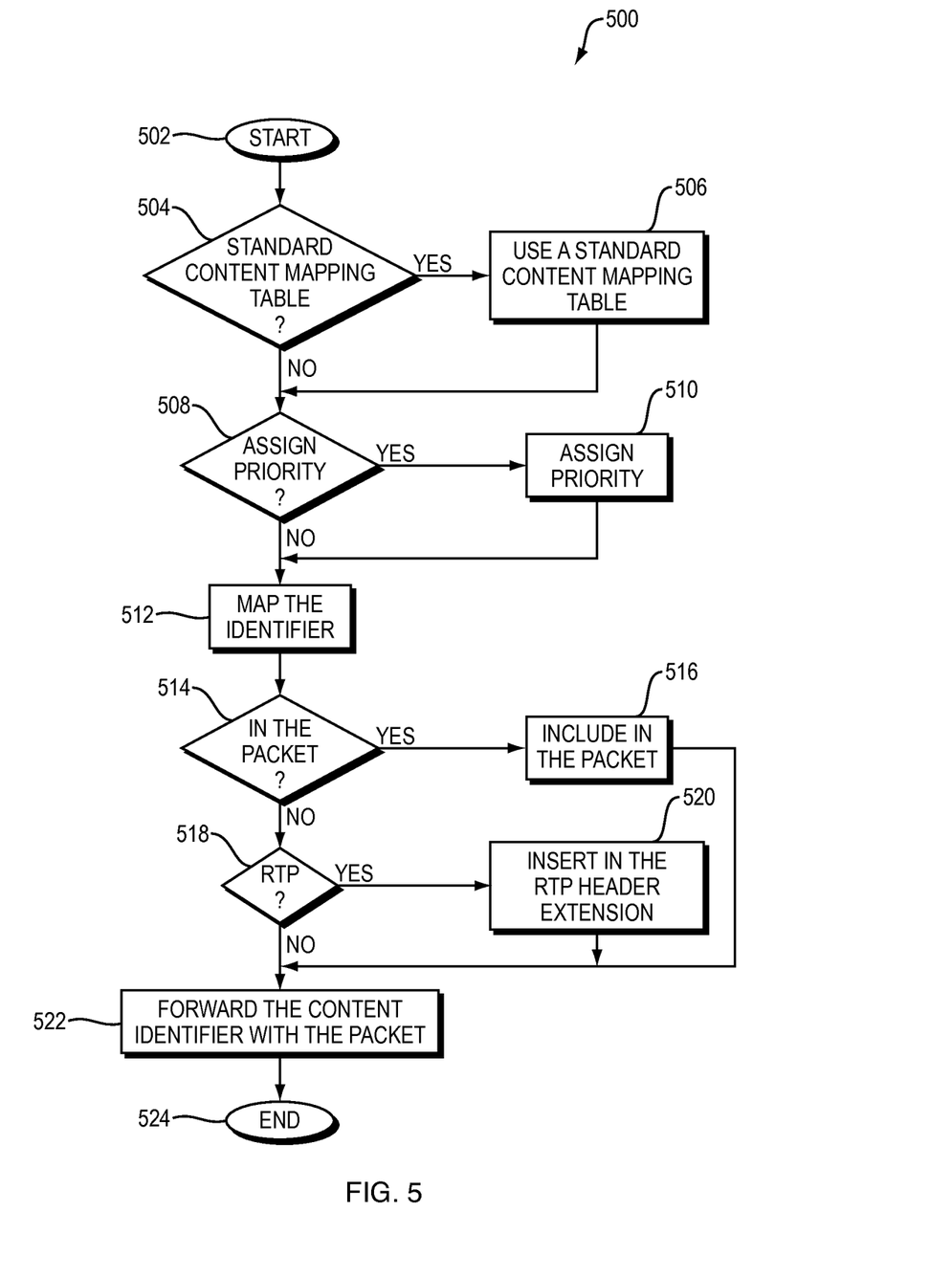
FIG. 5 is a flow diagram of another embodiment of a method for prioritizing packets in a communications network.

FIG. 5 is a flow diagram of another embodiment of a method for prioritizing packets in a communications network (500). The method may start (502) and determine whether or not to use a standard content mapping table (504). If yes, mapping content to the content identifier may include utilizing a standard content mapping table (506). The method may check for whether or not to assign a priority to the content identifier (508). If no, a downstream node may assign prioritization using the standard content mapping table (510). The method may map content to a content identifier (512) Mapping content to the content identifier may occur at the content source and assigning the priority to the content identifier may occur at a device separate from the content source.

The method may check for whether or not to include the content identifier in the packet (514). If yes, forwarding the content identifier with the packet may include forwarding the content identifier in a packet associated with the packet including the content (516). If not, a check may be made for whether or not to specifying the content identifier in a Real-Time Protocol (RTP) header extension (518). If yes, forwarding the content identifier with the packet may include specifying the content identifier in a Real-Time Protocol (RTP) header extension (520). The method may further forward the content identifier with the packet to enable a downstream network node to effect prioritization of the packet within the packet stream (522) and the method thereafter ends (524) in this example embodiment.

Figure 6:
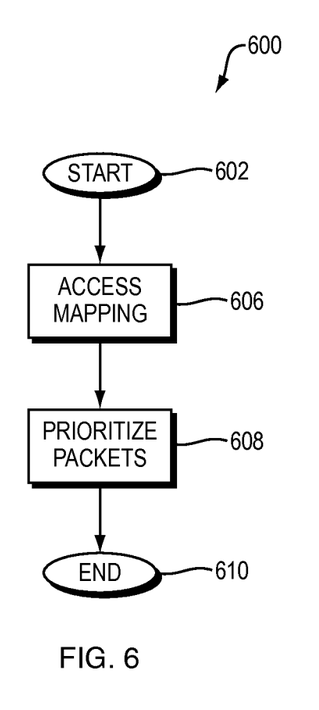
FIG. 6 is a flow diagram of an embodiment of a method for prioritizing packets at a network node.

FIG. 6 is a flow diagram of an embodiment of a method for prioritizing packets at a network node (600). The method may start (602) and access a mapping of a plurality of content identifiers to a plurality of prioritization values (606). The method may prioritize packets with a set of content identifiers of the plurality of content identifiers in a packet stream. The set of content identifiers may be a function of content included in the packets prioritized. Prioritizing may be based on the set of content identifiers and a set of prioritization values of the plurality of prioritization values based on the mapping accessed (608) and the method thereafter ends (610) in this example embodiment.

Figure 7:
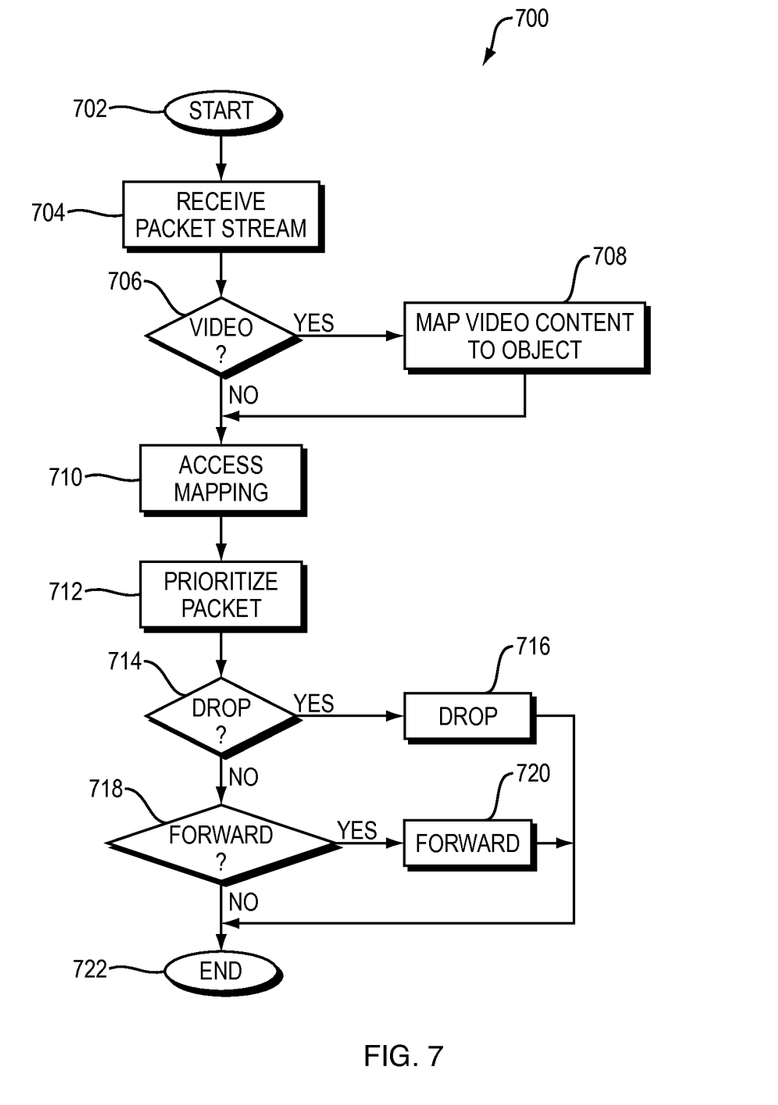
FIG. 7 is another embodiment of a method for prioritizing packets at a network node.

FIG. 7 is another embodiment of a method for prioritizing packets at a network node (700). The method may start (702) and receive a packet stream comprising a plurality of packets, each packet in the packet stream may include a content identifier that is a function of content in each packet (704). The may check whether or not the content is contained within a video frame (706). If yes, the method may map video content to a substantive object identifier (708). The method may access a mapping of a plurality of content identifiers to a plurality of prioritization values (710). The method may prioritize each packet received based on the content identifier included and a mapping of the content identifier to a prioritization value based on the mapping accessed (712). The method may further include determining a drop or forward action for each packet based on the content identifier included and the mapping of the content identifier to the prioritization value (714). If drop, the method may drop the packet (716) and the method thereafter ends (722) in this example embodiment. If forward (718), the method may forward the packet (720) and the method thereafter ends (722) in this example embodiment.

Figure 8:
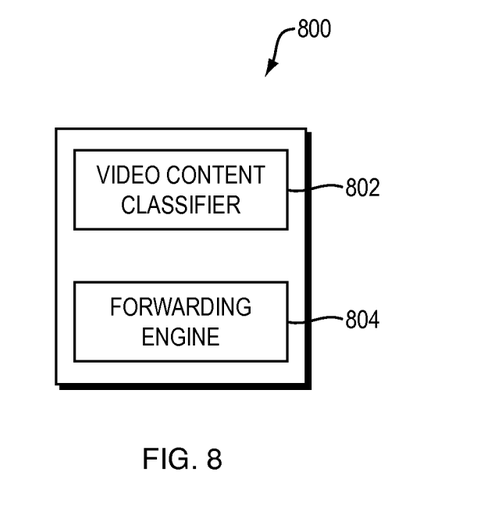
FIG. 8 is a block diagram of an embodiment of an apparatus.

FIG. 8 is a block diagram of an embodiment of an apparatus (800). The apparatus may comprise a video content classifier configured to assign a content identifier as a function of content in a packet of a video packet stream on a packet-by-packet basis (802). The apparatus may further include a forwarding engine configured to forward the content identifier with the packet to enable a downstream network node to effect prioritization of the packet within the video packet stream (804).

From the viewpoint of a networking vendor, video is just another type of data. Data may be prioritized based on certain pre-defined values, but often, when a link is saturated a network device simply drops low-priority traffic based on a static pre-configured value. Network devices don't understand video because they are focused on other problems of networking. Video frame/packet priority may be dynamic based on the actual content of the video. According to techniques disclosed herein, a networking device such as the switch 116*a* and router 116*b* do not need to understand each codec (e.g., MPEG-4, H.264, WebM, etc.) to decode each packet in order to determine the packet content. According to embodiments of methods disclosed herein, a custom RTP header extension may be supplied that provides a corresponding content identifier to the content of a video packet in a codec-neutral format.

Multiple problems may be solved according to techniques disclosed herein. Network devices such as the switch 116*a* or router 116*b* do not need to understand a codec type to determine whether or not it is "safe" to drop a packet. A network device may make drop decisions that are guided by a content identifier. Packets, or video frames that contain useful information such as the face of an intruder or license plate of a vehicle may be prioritized and have a higher probability of being delivered. Further, using MPEG-4 as an example, according to embodiments of methods disclosed herein, bandwidth consumption may be reduced by determining whether or not to drop an entire Group of Pictures (GOP).

Processing video for low-bandwidth transmission may be complex as it may require a complete decode/encode if the video frame is at either a lower frame-rate or small resolution. An encode/decode process may be CPU intensive, codec specific, and add delay to media delivery process. Further, simple packet drop decision mechanisms may substantially degrade video as dropping a single frame may result in severe degradation of video. For example, in the case of MPEG-4, dropping a single predicted (P) frame (P-frame) may result in degradation of video until the next intra (I) frame (I-frame). Dropping a single packet of an I-frame may result in an entire Group of Pictures (GOP) being dropped.

Embodiments of methods disclosed herein are not limited to video content. Any suitable content being transported over a network may benefit from embodiments of methods disclosed herein. For example, a voice call may benefit. A voice call may be segmented into multiple packets. Each packet of a voice call may be assigned a content identifier, based on the content of the voice call that is included in the packet. In the case of a voice call, a packet with a content identifier indicating silence may be given lower priority than a packet with a content identifier indicating voice. If bandwidth needs to be reduced, packets having lower priority may be dropped before packets of a higher priority. As such, packets including silence may be dropped before packets including voice content.

Figure 9:
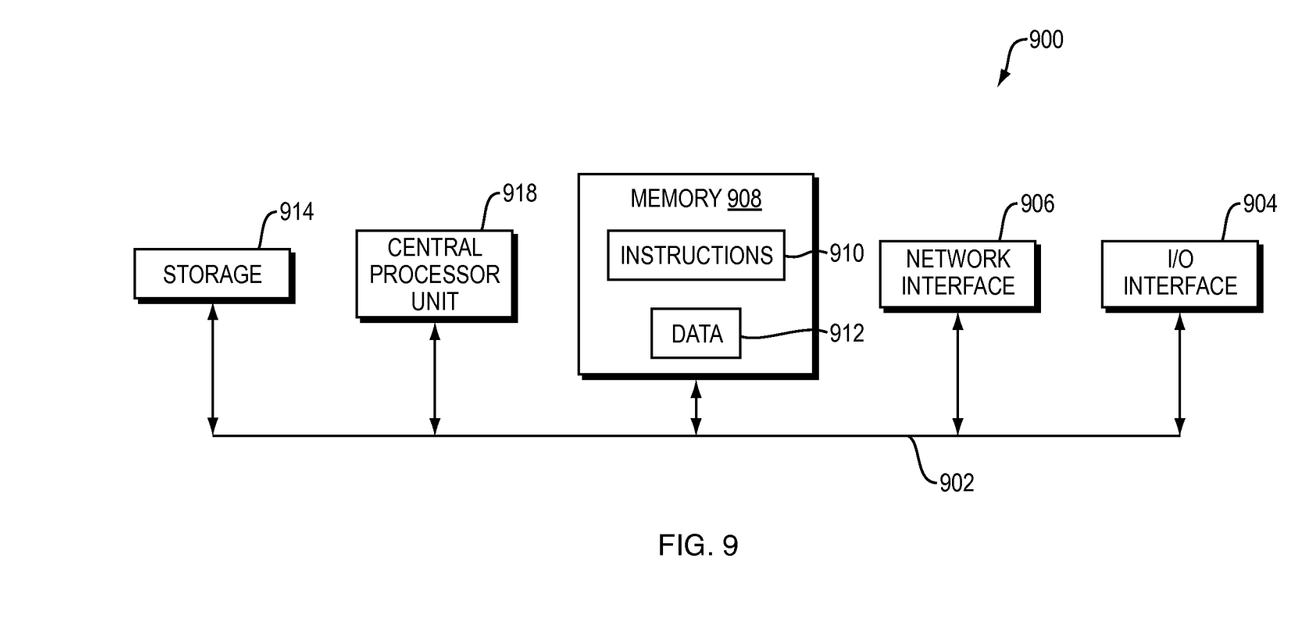
FIG. 9 is a block diagram of an example internal structure of a computer in which various embodiments of the present invention may be implemented.

FIG. 9 is a block diagram of an example internal structure of a computer 900 in which various embodiments of the present invention may be implemented. The computer 900 contains system bus 902, where a bus is a set of hardware lines used for data transfer among the components of a computer or processing system. Bus 902 is essentially a shared conduit that couples different elements of a computer system (e.g., processor, disk storage, memory, input/output ports, network ports, etc.) that enables the transfer of information between the elements. Coupled to system bus 902 is I/O device interface 904 for coupling various input and output devices (e.g., keyboard, mouse, displays, printers, speakers, etc.) to the computer 900. Network interface 906 allows the computer 900 to couple to various other devices attached to a network. Memory 908 provides volatile storage for computer software instructions 910 and data 912 may be used to implement embodiments of the present invention. Disk storage 914 provides non-volatile storage for computer software instructions 910 and data 912 that may be used to implement embodiments of the present invention. Central processor unit 918 is also coupled to system bus 902 and provides for the execution of computer instructions.

Example embodiments of the present invention may be configured using a computer program product; for example, controls may be programmed in software for implementing example embodiments of the present invention. Further example embodiments of the present invention may include a non-transitory computer-readable medium containing instructions that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer-readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method for prioritizing packets from a plurality of different content sources in a communications network, the method comprising:
   at each content source from the plurality of different content sources, mapping content to a content identifier according to a content type of the content, the content including a representation of a real-world article, the content type indicating substantive subject matter contained within audio, image or video data of the content;
   at each content source, assigning the content identifier as a function of the content type of the content in a packet of a packet stream on a packet-by-packet basis; and
   at each content source, forwarding the content identifier in a codec-neutral format in a Real-Time Protocol (RTP) header extension with the packet across the network to enable a downstream network node which is independent of the content sources receiving the packet to effect prioritization of the packet received within the packet stream, irrespective of codec type, by extracting the content identifier forwarded in the codec-neutral format from the packet received to determine the priority for the packet according to a content mapping table including mappings between content types, content identifiers and priorities,
   wherein each content identifier includes a respective field specifying a respective version of the content identifier;
   at the downstream network node, extracting content identifiers from the packets generated from the different content sources, wherein a priority is assigned to each extracted content identifier according to the content mapping table, the assigning of a priority to each extracted content identifier including decoding the respective version included in each extracted content identifier;
   at the downstream network node, determining drop or forward actions for the packets prioritized based on the assigned priority values.

2. The method according to claim 1, wherein each content source is a video camera, a video recorder, or a gateway.

3. The method according to claim 1, wherein the content is contained within a video frame.

4. The method according to claim 1, wherein the substantive object identifier indicates a face, a license plate, or a personalized identifier.

5. The method according to claim 1, wherein the content mapping table is a standard content mapping table.

6. The method according to claim 5, wherein the downstream node assigns prioritization using the standard content mapping table.

7. The method according to claim 1, further including assigning a priority to the content identifier.

8. The method according to claim 7, wherein mapping content to the content identifier occurs at the content source and assigning the priority to the content identifier occurs at a device separate from the content source.

9. The method according to claim 1, wherein forwarding the content identifier with the packet includes forwarding the content identifier in a packet associated with the packet including the content.

10. The method according to claim 1, further comprising mapping video content to a substantive object through the use of the content identifier specified in the Real-Time Protocol (RTP) header extension maps.

11. The method according to claim 1, wherein packets within the packet stream are selectively forwarded or dropped on a network according to the prioritization of the packets, which is based on the content identifier of each packet, to forward useful security-pertinent content or drop content less pertinent to security respectively.

12. The method according to claim 1, wherein the substantive object identifier identifies the substantive subject matter contained within content comprising a scene in an image.

13. The method according to claim 1, wherein the substantive subject matter comprises an object in an image or video data of the content captured from a content source comprising a camera, a priority of an object having a distance closer to the camera being higher than an object having a distance farther away from the camera.

14. A method for prioritizing packets from a plurality of different content sources at a network node which is independent of the content sources in a communications network, the method comprising:
   receiving packets at the network node from different content sources over a network, the received packets having a set of content identifiers forwarded in a codec-neutral format in a Real-Time Protocol (RTP) header extension and being a function of respective content type of content included in the received packets, the content including a representation of a real-world article, wherein each content identifier includes a respective field specifying a respective version of the content identifier;
   accessing a content mapping table including mappings between a plurality of content types, content identifiers and prioritization values, each content type indicating substantive subject matter contained within audio, image or video data of content;

extracting content identifiers from the packets generated from the different content sources, wherein a priority is assigned to each extracted content identifier according to the content mapping table, the assigning of a priority to each extracted content identifier including decoding the respective version included in each extracted content identifier; and determining drop or forward actions for the packets prioritized based on the assigned priority values.

15. The method according to claim 14, wherein the content is contained within a video frame.

16. The method according to claim 14, further including assigning the set of content identifiers at a video source.

17. A system comprising:
a plurality of different content sources configured to communicate over a communications network, each content source including at least a processor and a memory storing computer-executable instructions which, when loaded and executed by the processor, configured to implement:
  a video content classifier configured to assign a content identifier as a function of a content type of content in a packet of a video packet stream on a packet-by-packet basis, the content including a representation of a real-world article, the content type indicating substantive subject matter contained within video data of the content in a packet of a video packet stream; and
  a forwarding engine configured to forward the content identifier with the packet in a codec neutral format in a Real-Time Protocol (RTP) header extension across a network to enable a downstream network node which is independent of the content sources to effect prioritization of the packet within the video packet stream, irrespective of codec type, by extracting the content identifier forwarded in the codec-neutral format from the packet received to determine the priority for the packet according to a content mapping table including mappings between content types, content identifiers and priorities,
wherein each content identifier includes a respective field specifying a respective version of the content identifier,
at the downstream network node, content identifiers are extracted from the packets generated from the different content sources, wherein a priority is assigned to each extracted content identifier according to the content mapping table, the assigning of a priority to each extracted content identifier including decoding the respective version included in each extracted content identifier, and
at the downstream network node, drop or forward actions are determined for the packets prioritized based on the assigned priority values.

18. A system comprising:
a plurality of different content sources configured to communicate over a communications network, each content source including at least a processor and a memory configured to:
  process a video scene and produce a packet stream including a plurality of packets representing the video scene;
  assign a content identifier to each packet in the plurality of packets, each packet including an assigned content identifier, the content identifier assigned as a function of a content type of the video content represented by each packet, the content including a representation of a real-world article, the content type indicating substantive subject matter contained within video data of video content in a packet; and
  forward each assigned content identifier with each corresponding packet in a codec neutral format in a Real-Time Protocol (RTP) header extension across a network to enable a downstream network node which is independent of the content sources to effect prioritization of the corresponding packet within the packet stream, irrespective of codec type, by extracting the assigned content identifier forwarded in the codec-neutral format from the packet received to determine a priority for the corresponding packet according to a content mapping table including mappings between content types, content identifiers and priorities,
wherein each content identifier includes a respective field specifying a respective version of the content identifier,
at the downstream network node, content identifiers are extracted from the packets generated from the different content sources, wherein a priority is assigned to each extracted content identifier according to the content mapping table, the assigning of a priority to each extracted content identifier including decoding the respective version included in each extracted content identifier, and
at the downstream network node, drop or forward actions are determined for the packets prioritized based on the assigned priority values.

* * * * *